3,338,815
PREFERENTIAL ADSORPTION OF NORMAL
PARAFFINS ON GRAPHITE
Aleksander Jerzy Groszek, Ealing, London, England, assignor to The British Petroleum Company Limited, London, England, a corporation of England
No Drawing. Filed Feb. 2, 1966, Ser. No. 524,504
Claims priority, application Great Britain, Sept. 25, 1964, 39,140/64; Sept. 24, 1965, 40,702/65
9 Claims. (Cl. 208—26)

This application is a continuation-in-part of copending application Ser. No. 490,092, filed Sept. 24, 1965, now abandoned.

This invention relates to the separation of long-chain normal hydrocarbons from their mixtures with other hydrocarbons, particularly from petroleum fractions.

According to the present invention a method of separating long-chain normal hydrocarbons having at least 10 carbon atoms per molecule from their mixtures with other hydrocarbons comprises contacting the mixture with graphite having a surface area of at least 50 m.²/gm., to adsorb selectively the normal hydrocarbons.

Preferably the separation is carried out in the presence of a solvent which is lower-boiling than the feedstock, particularly one of the common solvents for high-boiling hydrocarbons, for example benzene, n-heptane, iso-octane, ethyl alcohol, or petroleum ether.

The mixture is preferably contacted with the graphite in the form of a dilute solution, preferably containing between 0.01% and 10% (weight per volume) of the normal hydrocarbons. Within this range the amount of n-hydrocarbons adsorbed increases with the concentration of the solution.

The amount of hydrocarbon adsorbed increases with the surface area of the graphite, and the surface area is preferably, therefore, as high as possible preferably within the range 50–900 m.²/gm., particularly 300–700 m.²/gm. The surface area of the graphite may be increased, for example, by grinding it. "Oleophilic graphite" as defined below is preferred.

The amount of preferential adsorption also varies inversely with temperature, and preferably the adsorption is carried out at a temperature within the range $-50°$ C. to $+50°$ C.

The nature of the solvent has also been found to affect the amount of selective adsorption, which increases with the polarity of the solvent.

The chain length of hydrocarbons separable according to the method of the present invention will also depend to a certain extent on the solvent, the more polar the solvent the shorter will be the shortest chain length of hydrocarbon which can be adsorbed. For example using n-heptane, hydrocarbons of $C_{24}$ and above can be adsorbed whereas using ethyl alcohol hydrocarbons as low as $C_{10}$ can be adsorbed.

The efficiency of adsorption has, moreover, been found to increase with increasing chain length.

Subsequent desorption of the selectively adsorbed hydrocarbons may be effected by any of the customary methods, for example, by flushing with an excess of a solvent such as benzene, heating, or evacuating.

The process of the present invention may be utilized, for example, for the isolation and concentration of compounds with long normal paraffinic chains from heavy petroleum distillates. In particular, however, the process is useful for the reduction of cloud points and pour points of petroleum fractions and for dewaxing petroleum fractions especially to produce fractions having high viscosity indices and also low sulphur contents.

The invention is illustrated with reference to the following examples:

Example 1

10.3 grams of a 160/95 grade lubricating oil derived from mixed Kuwait and Iraq crude oils were dissolved in 100 mls. of iso-octane and the solution slurried with 19.5 grams of a synthetic graphite ground in air to a BET surface area of 450 m.²/g. The slurry was filtered at ambient temperature and a product containing 75% by weight of the original oil was obtained. The filter was then washed with toluene at 80° C. when a further product forming 25% weight of the original oil was obtained. The results are summarized in the following Table 1:

Example 2

8.0 grams of a 30/97 grade oil derived from Zarzatine crude oil were dissolved in 70 mls. of iso-octane and the solution slurried with 32.0 grams of the graphite of Example 1. The procedure of Example 1 was then repeated. The results are summarized in Table 2 below:

TABLE 1

| Product, percent wt. of feed | Viscosity, cSt | | Viscosity Index | Pour Point, °F. | Sulphur, percent wt. | Carbon Type Analysis | | | Colour |
|---|---|---|---|---|---|---|---|---|---|
| | 100° F. | 210° F. | | | | Cp | CN | CA | |
| 70 (by filtration) | 96.49 | 10.44 | 98 | −15 | 0.62 | 64 | 33 | 3 | Water White. |
| 25 (by elution with hot toluene) | 100.48 | 11.11 | 104 | +5 | | | | | Yellow. |
| Feed | 109.8 | 11.23 | 96 | 0 | 1.14 | 66 | 30 | 4 | Do. |

TABLE 2

| Product, percent wt. of feed | Viscosity, cSt | | Viscosity Index | Pour Point, °F. | Sulphur, percent wt. | Carbon Type Analysis | | | Colour |
|---|---|---|---|---|---|---|---|---|---|
| | 100° F. | 210° F. | | | | Cp | CN | CA | |
| 65 (by filtration) | 38.40 | 5.66 | 93 | −15 | | | | | Water White. |
| 30 (by elution with hot toluene) | 32.67 | 5.39 | 110 | +10 | | | | | Yellow. |
| Feed | 36.66 | 5.60 | 99 | +4 | | | | | Do. |

Example 3

5.05 grams of a naphthenic/paraffinic fraction obtained by selective solvent extraction of the 160/95 grade oil of Example 1 were dissolved in 50 mls. of iso-octane and the solution slurried with 21 grams of the graphite of Example 1. The procedure of Example 1 was then repeated. The results are summarized in Table 3 below:

The above data indicate that Agha Jari waxy distillates yield 5 to 10% by weight of oil with a sulphur content of 0.1–0.2% weight and a pour point below −60° C.; the yield of oil with a pour point of +10° F. is higher, between 25 and 35%, with the sulphur content varying between 0.1 and 0.4% weight. All these oils are either water white or very pale yellow.

TABLE 3

| Product, percent wt. of feed | Viscosity, cSt 100° F. | Viscosity, cSt 210° F. | Viscosity Index | Pour Point, ° F. | Sulphur, percent wt. | Carbon Type Analysis $C_P$ | $C_N$ | $C_A$ | Colour |
|---|---|---|---|---|---|---|---|---|---|
| 65 (by filtration) | 89.29 | 10.01 | 100 | −20 | | 63 | 37 | 0 | Water White. |
| 33 (by elution with hot toluene) | 66.51 | 9.22 | 120 | +10 | | 75 | 25 | 0 | Straw Yellow. |
| Feed | 74.5 | 9.37 | 110 | +5 | | 67 | 33 | 0 | Water White. |

Example 4

4 grams of a waxy raffinate obtained by the selective solvent extraction of the lubricating oil feedstock of Example 1 were dissolved in 50 mls. of petroleum ether and the solution slurried with 17 grams of the graphite of Example 1. The procedure of Example 1 was then repeated. The results are summarized in Table 4 below:

The volume of solvent required to elute the desired oil fractions at room temperature was 150 ml. out of a total of 750 ml. necessary to displace all the oil from 90 grams of graphite.

Suitable solvents for use at room temperature may be any light paraffinic hydrocarbon boiling below 60° C.

TABLE 4

| Product, percent wt. of feed | Viscosity, cSt 100° F. | Viscosity, cSt 210° F. | Viscosity Index | Pour Point, ° F. | Sulphur, percent wt. | Carbon Type Analysis $C_P$ | $C_N$ | $C_A$ | Colour |
|---|---|---|---|---|---|---|---|---|---|
| 47 (by filtration) | 91.95 | 10.06 | 98 | +5 | 0.48 | 64 | 33 | 3 | Water White. |
| Feed | Solid at room temperature | | | 100 | 1.05 | | | | Dark Yellow. |

Example 5

An Agha Jari waxy distillate was treated with graphite having a BET surface area of 500 m.²/g. in a chromatographic column with a succession of solvents which are indicated, with the results obtained, in the following Table 5:

For a final hot elution stage for example benzene, as in the present example or toluene may be used. In the present example 500 ml. of benzene at 80° C. were required to remove adsorbed waxes and aromatic compounds from the 90 grams of graphite.

TABLE 5

Feedstock, 21.0 g.
Graphite, 90.0 g.
Eluent Flowrate, 50 ml./h.
Pressure Drop, 50 p.s.i.
Column Height, 10 in.
Column Diameter, 1½ in.

| Cumulative, percent oil Eluted | Solvent Volume, ml. | Cloud Point, ° F. | Pour Point, ° F. | Sulphur, percent | Viscosity, cSt 100° F. | 210° F. | Viscosity Index | Colour |
|---|---|---|---|---|---|---|---|---|
| 9 | Petroleum ether, 50 | [1] −70 | −45 | 0.1 | 53.3 | 6.81 | 88 | Water White. |
| 17 | Petroleum ether, 25 | −8 | −10 | 0.3 | 66.8 | 7.87 | 90 | Do. |
| 29 | Petroleum ether, 50 | 27 | −30 | 0.6 | 70.9 | 8.27 | 92 | Straw Yellow. |
| 40 | n-C₇ 100 | 47 | 50 | 0.9 | 73.2 | 8.26 | 87 | Do. |
| 56 | n-C₇ 500 | 57 | 60 | 1.0 | 78.1 | 8.55 | 86 | Dark Yellow. |
| 68 | Benzene, 500 | 66 | 75 | 2.5 | 120 | 9.99 | 58 | Yellow. |
| 95 | Hot (80° C.) benzene, 500 | | | ca. 3 | | | | |
| Feed | | 105 | | ca. 1.8 | | 10.59 | 67 | |

[1] Below.

Example 6

A Libyan waxy distillate was treated in a manner similar to that employed in Example 5 as indicated in Table 6 below:

TABLE 6

Feedstock, 20.15 g.
Graphite, 85 g.
Eluent flow rate, 50 ml./hr.

Pressure Drop, 50 p.s.i.
Column Height, 10 in.
Column Diameter, 1½ in.

| Cumulative, Percent Oil Eluted | Solvent Volume, ml. | Pour Point, °F. | Viscosity cSt 100° F. | Viscosity cSt 210° F. | Viscosity Index | Colour |
|---|---|---|---|---|---|---|
| 1.8 | Aviation Alkyate (Av. Alk.), 42 | −70 | | | | Water White. |
| 8.4 | Av. Alk., 50 | −25 | | | | Do. |
| 16.3 | Av. Alk., 50 | +25 | 18.77 | 3.79 | 100 | Do. |
| 22.2 | Av. Alk., 50 | | 13.11 | 3.15 | 117 | Do. |
| 28.4 | Av. Alk., 50 | | | | | Do. |
| 48.4 | Hot (80° C.) Av. Alk., 100 | (¹) | | | | Do. |
| 61.6 | Hot (80° C.) Av. Alk., 70 | (¹) | | | | Do. |
| 79.6 | Hot (80° C.) Benzene, 200 | (¹) | | | | Yellow. |
| 99.8 | Hot (80° C.) Benzene/Ethanol, 200 | (¹) | | | | Do. |
| Feedstock | | 100 | | 4.26 | 90 | Do. |

¹ Solid at room temperature.

Example 7

Full separation of waxy distillate into dewaxed components and waxes plus aromatic components takes place when the speed of elution (including the charging of feedstock) is 600 ml. per 100 g. of graphite per hour. This speed of elution can be achieved using shallow beds of graphite powder with a diameter to height ratio of about 2. Batch treatment of a Kuwait waxy distillate using 24 g. of graphite (BET surface area 658 m.²/g.) to 6 g. of oil with the contact time of 15 minutes gave the following results, shown in Table 7.

Example 8

High yields of low cloud and pour point oil can be obtained by using a mixture of benzene and alcohol as solvent throughout the separation. When Middle East waxy distillates are used, this process gives high yields of oils with very low cloud points but relatively high S and aromatic contents. Details of fractionation in a chromatographic column by this method of an Agha Jari waxy distillate are given in Table 8.

Example 9

When graphite is used for the treatment of mineral oils free from aromatic and sulphur compounds, it preferentially absorbs components with a high percentage of carbon atoms in long methylene chains, i.e. the compounds with a relatively high pour point and high viscosity index. An illustration of such treatment is given in Table 9.

TABLE 7

| Cumulative, Percent Oil Product | Solvent Volume, ml. | Pour Point, °F. | Viscosity, cSt 100° F. | Viscosity, cSt 210° F. | Viscosity Index | Sulphur, Percent |
|---|---|---|---|---|---|---|
| 30 (filtered) | 60 (petroleum ether) | 0 | 71.3 | 8.46 | 97 | 1.24 |
| 95 (eluted) | 150 (hot (80° C) toluene) | ¹ +70 | | | | |
| Feedstock | | ¹ +70 | 93.03 | 9.21 | 77 | 2.71 |

¹ Above.

TABLE 8

Feedstock, 25 g.
Graphite, 90 g.
Solvent, 20% ethanol in benzene.

Pressure Drop, 50 p.s.i.
Column Height, 10 in.
Column Diameter, 1½ in.

| Cumulative Percent Oil Eluted | Solvent Volume, ml. | Cloud Point, °F. | Pour Point, °F. | Viscosity, cSt 100° F. | Viscosity, cSt 210° F. | Viscosity Index | Sulphur, Percent | Colour |
|---|---|---|---|---|---|---|---|---|
| 5.1 | 50 | −60 | −35 | | | | | Yellow. |
| 28.3 | 50 | −18 | −15 | 99.71 | 9.54 | 75.5 | 1.2 | Do. |
| 59.3 | 50 | 26 | 30 | 111 | 9.99 | 70 | 1.64 | Dark Yellow. |
| 99.0 | 600 at 80° C. | | ca. 120 | | | | ca. 3 | Do. |

TABLE 9

Feedstock, 25.8 g.
Graphite, 90 g. (used previously 6 times).
Solvent, Iso-octane.

Pressure, 50 p.s.i.
Column Height, 10 in.
Column Diameter, 1½ in.

| Cumulative, Percent Oil Eluted | Solvent Volume, ml. | Cloud Point, °F. | Pour Point, °F. | Viscosity, cSt 100° F. | Viscosity, cSt 210° F. | Viscosity Index |
|---|---|---|---|---|---|---|
| 17.9 | 50 | | −35 | 44.93 | 6.64 | 109 |
| 44.1 | 50 | −20 | −19 | 53.25 | 7.70 | 105 |
| 59.9 | 50 | −14 | −15 | | | |
| 69.9 | 50 | −10 | −8 | 57.12 | 7.59 | 104 |
| 95.0 | ¹ 400 | | ca. +25 | 45.61 | 7.08 | 122 |
| Feedstock | | | ca. +10 | 57.15 | 7.65 | 106 |

¹ Hot (80° C.) iso-octane.

Example 10

The treatment of mineral oils, substantially free from aromatic and sulphur compounds, can be carired out also by mixing 50 parts of the oil with 100 parts of graphite in a light paraffinic solvent. About 70 percent of the oil remains in the filtrate and constitutes the low cloud point portion; the adsorbed material, which can be desorbed with the same solvent at about 100° C., and has an increased viscosity index compared with the original oil. Naphthene and paraffin portion from a Kuwait BG 160/95 treated in this way gave the following fractions.

TABLE 10

| Cumulative Percent Oil Product | Solvent Volume, ml. | Pour Point, °C. | Viscosity, cSt | | Viscosity Index |
|---|---|---|---|---|---|
| | | | 100° F. | 210° F. | |
| 70 (filtered) | 250 | −20 | 71.24 | 9.07 | 110 |
| 30 (eluted) | 400 (90° C.) | | 62.76 | 8.86 | 121 |
| Feedstock | | +5 | 79.56 | 9.72 | 109 |

Example 11

Similar results are obtained by treating commercial technical white oils. Oils with cloud points below −60° F. can be obtained similarly by decreasing the ratio of oil to graphite to 1:5. The yield of such an oil is about 30 percent weight of the feedstock. Thus naphthenes and paraffins from a BG 150/75 oil treated with graphite yields 32 percent of oil with a cloud point below −60° F. and VI of 98.

A particularly desirable form of graphite for use in this invention is prepared by grinding natural or synthetic graphite in an organic liquid. This graphite product can conveniently be referred to as "oleophilic graphite" to distinguish it from conventional forms of graphite.

In preparing oleophilic graphite, the starting material may be natural or synthetic graphite. Both these materials are well-known and readily available. The synthetic material is produced from petroleum coke usually by heating to around 2500° C. in a vacuum or inert gas. Typically it contains from 95 to 100% wt. carbon. The natural material may have a slightly lower carbon content than this and usually has a larger crystal size.

Satisfactory oleophilic graphite can be obtained by grinding in most organic liquids but it is desirable to use one the bulk of which can be easily removed from the oleophilic graphite. Those liquids distilling below 500° C. and having a viscosity below 600 centistokes at 100° F. are therefore preferred. Suitable organic liquids are the hydrocarbons such as n-heptane, iso-octane, toluene, hexadecane and hydrocarbon fractions obtained by the distillation of petroleum, for example, lubricating oil. Other organic liquids that may be used include most volatile oxygen-, halogen-, nitrogen- and sulphur-containing organic liquids, for example isopropyl alcohol and carbon tetrachloride. Liquids that react with graphite under the conditions of the treatment should of course not be used. For best results, the amount of graphite in the graphite/organic liquid mixture should not exceed 50% wt.; preferably it should be from 2 to 20% wt.

The grinding may be carried out in any suitable grinding mill or device and it is desirable to continue the grinding until an oleophilic graphite having a surface area (as determined by nitrogen adsorption) of from 20 to 800 square metres per gram is obtained. For use in the separation method of the present invention, the surface area should be at least 50 m.²/gm. and preferably at least about 300 m.²/gm. Usually this can be achieved by grinding at normal temperatures for the required period but the temperature of the mixture may be artificially increased if desired, for example, up to 250° C.

One of the quickest and most effective techniques is to carry out the grinding in a vibratory ball mill.

It is desirable to exclude air so far as possible during the grinding operation and this can be most easily achieved by filling the mill with the organic liquid first, followed by the balls and graphite. A suitable procedure is to fill the mill with the liquid, add half the balls, then the graphite and finally the rest of the balls. Air dissolved in the organic liquid has no harmful effect.

When using a ball mill, it is of course desirable to use balls made of a material which does not react with the graphite and which does not wear unduly during the grinding. Vibratory ball mills usually contain steel balls and these are suitable for the present purpose.

A suitable vibratory ball mill is sold under the trade name "Megapact." The grinding effect is produced by the impact of the balls upon the graphite and upon each other.

Separation of the balls from the graphite/liquid mixture after grinding is easily effected by sieving.

Separation of the bulk of the organic liquid from the oleophilic graphite may be carried out by any suitable means, for example, by evaporation of the liquid. Where a high boiling or viscous liquid is used, it may be necessary first of all to displace it by washing with a lighter liquid.

It will not usually be possible to separate the whole of the organic liquid from the graphite but the presence of small amounts of the liquid in the oleophilic graphite is not usually a disadvantage and may even be an advantage in certain applications of the product. For most purposes a liquid content of not more than 10% wt. in the oleophilic graphite is desirable after the separation process; the retained liquid will be mainly adsorbed liquid.

The superiority of oleophilic graphite for preferential separation is shown in Table 11 below. Two oleophilic graphite products were prepared from synthetic graphite as described below. Table 11 below compares the properties of these products with a ground graphite of similar surface area prepared by grinding in air and with a highly adsorbent activated charcoal of very high surface area.

TABLE 11

| Absorbent | Surface Area m²/g. | n-Dotriacontane Absorbed from 0.1% Solution in n-heptane, mg./m². | n-Butyl Alcohol Absorbed from 0.1% Solution in n-heptane, mg./m². |
|---|---|---|---|
| (A) Graphite ground in Megapact vibration mill for 80 minutes in n-heptane | 70 | 0.44 | 0.03 |
| (B) Graphite ground in Megapact vibration mill for 160 minutes in n-heptane | 68 | 0.44 | 0.03 |
| (P) Graphite ground in Megapact vibration mill for 35 minutes in air | 68 | 0.38 | 0.10 |
| (Q) Highly adsorbent activated charcoal | 1,345 | 0.07 | |

It will be seen that the two oleophilic graphites (A and B) have a higher adsorption capacity for n-paraffins than a graphite (P) of similar surface area prepared by grinding in air and a much lower adsorption capacity for polar compounds. The oleophilic graphites also had a very much higher capacity for adsorbing n-paraffins than the activated charcoal (Q) which was known to have a high adsorptive capacity for n-paraffins.

The enhanced oleophilic properties of the oleophilic graphites was further demonstrated by measuring the heats of preferential adsorption of n-dotriacontane and n-butyl alcohol on graphites B and P using the Flow Microcalorimeter as described in Chemistry and Industry 20th March 1965, pp. 482–489. The results are given in Table 12.

TABLE 12

| Adsorbent | Heat of Adsorption from n-heptane milli calories | |
|---|---|---|
| | n-Dotriacontane | n-Butyl alcohol |
| P | 690 | 830 |
| B | 825 | 39 |

The mill used for the grinding is a vibratory ball mill called by the manufacturer a "Megapact" mill. The grinding chambers are steel cylinders of 1½ inch internal diameter by 15 inches long and are nearly filled with ¼ inch diameter steel balls. The mill is fitted with a one eighth horsepower electric motor and the oscillation can be adjusted from 1 to 4 mm. In operation, each cylinder was filled completely with the n-heptane and the steel balls and 25 to 30 grams of graphite were added. This left about 150 to 200 cc. n-heptane in each cylinder. The ends were then sealed with metal caps fitted with rubber washers and the grinding was carried out. After grinding, the contents of the cylinders were placed in sieves which retained the balls and the n-heptane was removed from the oleophilic graphite by evaporation.

The oleophilic graphites described herein are also suitable for use as thickeners for high molecular weight organic liquids, unlike graphite ground in air.

I claim:
1. A method of separating long-chain normal hydrocarbons having at least 10 carbon atoms per molecule from their mixtures with other hydrocarbons comprising contacting the mixture with graphite having a surface of at least about 50 m.$^2$/gm., to adsorb selectively the normal hydrocarbons.

2. A method as claimed in claim 1 wherein the separation is carried out in the presence of a solvent which is lower-boiling than the feedstock, and is selected from benzene, n-heptane, iso-octane, ethyl alcohol, and petroleum ether.

3. A method as claimed in claim 2 wherein the feedstock mixture is contacted with the graphite in the form of a dilute solution containing between about 0.01% and 10% (weight per volume) of the normal hydrocarbons.

4. A method as claimed in claim 1 wherein the surface area of the graphite is within the range of about 300 to 700 m.$^2$/gm.

5. A method as claimed in claim 1 wherein the graphite employed is oleophilic graphite.

6. A method as claimed in claim 5 wherein the oleophilic graphite is prepared by grinding graphite in an organic liquid substantially non-reactive with graphite under the treatment conditions and having a boiling point below about 500° C. and a viscosity below about 600 centistokes at 100° F., the amount of graphite in the organic liquid during grinding being not in excess of 50% by weight.

7. A method as claimed in claim 6 wherein air is substantially excluded during the grinding of the graphite.

8. A method as claimed in claim 1 wherein the separation is carried out at a temperature within the range of about −50° C. to +50° C.

9. A method of dewaxing petroleum fractions comprising treating the fraction with graphite in accordance with claim 1.

References Cited
UNITED STATES PATENTS

| 2,300,420 | 11/1942 | Hassler et al. | 208—26 |
| 2,586,889 | 2/1952 | Vesterdal et al. | 208—310 |
| 3,054,662 | 9/1962 | Gessler | 23—209.1 |

DANIEL E. WYMAN, *Primary Examiner.*

P. E. KONOPKA, *Assistant Examiner.*

UNITED STATES PATENT OFFICE
CERTIFICATE OF CORRECTION

Patent No. 3,338,815                              August 29, 1967

Aleksander Jerzy Groszek

It is hereby certified that error appears in the above numbered patent requiring correction and that the said Letters Patent should read as corrected below.

Column 6, line 33, for "absorbs" read -- adsorbs --; columns 5 and 6, TABLE 7, first column, line 2 thereof, insert a closing parenthesis after "eluted"; column 7, line 3, for "carired" read -- carried --; line 8, strike out "and"; column 8, TABLE 11, heading to the first column, for "Absorbent" read -- Adsorbent --; same table, in the headings to the third and fourth columns, line 2 thereof, for "Absorbed", each occurrence, read -- Adsorbed --.

Signed and sealed this 15th day of October 1968.

(SEAL)
Attest:

Edward M. Fletcher, Jr.                                              EDWARD J. BRENNER
Attesting Officer                                                       Commissioner of Patents